US010919016B2

(12) United States Patent
Gansley

(10) Patent No.: US 10,919,016 B2
(45) Date of Patent: Feb. 16, 2021

(54) OXIDATION CONTROL FOR IMPROVED FLUE GAS DESULFURIZATION PERFORMANCE

(71) Applicant: General Electric Technology GmbH, Baden (CH)

(72) Inventor: Raymond Raulfs Gansley, Knoxville, TN (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 743 days.

(21) Appl. No.: 15/433,230

(22) Filed: Feb. 15, 2017

(65) Prior Publication Data

US 2018/0229179 A1 Aug. 16, 2018

(51) Int. Cl.
*B01D 53/14* (2006.01)
*B01J 10/00* (2006.01)
(Continued)

(52) U.S. Cl.
CPC .......... *B01J 10/002* (2013.01); *B01D 53/346* (2013.01); *B01D 53/504* (2013.01); *B01D 53/78* (2013.01);
(Continued)

(58) Field of Classification Search
CPC .... B01D 53/346; B01D 53/504; B01D 53/78; B01D 2251/102; B01D 2251/304;
(Continued)

(56) References Cited

U.S. PATENT DOCUMENTS 3,940,742 A 2/1976 Hudspeth et al.
4,108,959 A 8/1978 Tatani et al.
(Continued)

FOREIGN PATENT DOCUMENTS

CN 102078762 A 6/2011
CN 102078768 A 6/2011
(Continued)

OTHER PUBLICATIONS

International Search Report and Written Opinion issued in connection with corresponding PCT Application No. PCT/US2018/013082 dated Apr. 27, 2018.

*Primary Examiner* — Shogo Sasaki
(74) *Attorney, Agent, or Firm* — Grogan, Tuccillo & Vanderleeden, LLP

(57) ABSTRACT

A system and method of using the system for controlling oxidation of sulfites to reduce total nitrite and nitrate levels in a slurry is disclosed. The system includes a tank having an inlet for receiving a slurry produced in a wet flue gas desulfurization process. The tank also includes an inlet for receiving a gas. The inlet for receiving the gas is operable to disperse at least a portion of the gas received in the tank through at least a portion of the slurry received in the tank. A sensor is configured to measure a sulfite concentration of the slurry received in the tank to obtain a sulfite concentration measurement. In some embodiments, the sensor is a sulfite analyzer. In other embodiments, the sensor is a virtual analyzer. The system also includes a controller. Software executing on the controller generates an electronic signal affecting an adjustment of a flow rate of gas into the slurry in the tank based at least in part on the sulfite concentration/sulfite concentration measurement.

18 Claims, 3 Drawing Sheets

(51) Int. Cl.
   *B01D 53/34*    (2006.01)
   *B01J 19/00*    (2006.01)
   *B01D 53/50*    (2006.01)
   *C10G 70/00*    (2006.01)
   *B01D 53/78*    (2006.01)

(52) U.S. Cl.
   CPC .......... *B01J 19/0006* (2013.01); *C10G 70/00* (2013.01); *B01D 2251/102* (2013.01); *B01D 2251/304* (2013.01); *B01D 2251/402* (2013.01); *B01D 2251/404* (2013.01); *B01D 2251/606* (2013.01); *B01D 2258/0283* (2013.01); *B01J 2219/00164* (2013.01); *B01J 2219/00186* (2013.01)

(58) Field of Classification Search
   CPC ........ B01D 2251/402; B01D 2251/404; B01D 2251/606; B01D 2258/0283; B01J 19/0006; B01J 10/002; B01J 2219/00164; B01J 2219/00186; C10G 70/00
   See application file for complete search history.

(56) References Cited

U.S. PATENT DOCUMENTS

| | | | |
|---|---|---|---|
| 4,675,167 A | 6/1987 | Shinoda et al. | |
| 5,560,893 A | 10/1996 | Okino et al. | |
| 6,010,664 A | 1/2000 | Johnson et al. | |
| 6,029,100 A | 2/2000 | Iwashita et al. | |
| 6,187,277 B1 * | 2/2001 | Kirschner | B01D 53/1418 423/220 |
| 6,190,620 B1 | 2/2001 | Shinoda et al. | |
| 6,572,832 B2 * | 6/2003 | Smith | B01D 53/501 423/243.08 |
| 6,594,553 B1 | 7/2003 | Johnson et al. | |
| 7,113,835 B2 | 9/2006 | Boyden et al. | |
| 7,179,438 B2 * | 2/2007 | Jones | B01D 53/501 423/155 |
| 7,628,969 B2 * | 12/2009 | Holmes | B01D 53/505 423/242.1 |
| 7,887,769 B1 | 2/2011 | Smith | |
| 8,518,353 B1 * | 8/2013 | Neathery | B01J 8/1872 423/210 |
| 9,321,006 B2 | 4/2016 | Laslo | |
| 9,321,025 B2 | 4/2016 | Gansley et al. | |
| 2014/0017119 A1 | 1/2014 | DeVault et al. | |

FOREIGN PATENT DOCUMENTS

| | | |
|---|---|---|
| EP | 0224627 A1 | 6/1987 |
| EP | 0780151 A1 | 6/1997 |
| EP | 1040864 A2 | 10/2000 |
| EP | 2578292 A1 | 4/2013 |
| EP | 2578544 A1 | 4/2013 |
| EP | 2579032 A1 | 4/2013 |
| GB | 2159508 A | 12/1985 |
| JP | S60153924 A | 8/1985 |
| JP | S62225227 A | 10/1987 |
| JP | S63137734 A | 6/1988 |
| JP | H0372912 A | 3/1991 |
| JP | H0716425 A | 1/1995 |
| JP | H0866613 A | 3/1996 |
| JP | 20005087828 A | 4/2005 |
| KR | 20100041163 A | 4/2010 |
| WO | 96/14137 A1 | 5/1996 |
| WO | 2013/050990 A1 | 4/2013 |

* cited by examiner

OXIDATION CONTROL FOR IMPROVED FLUE GAS DESULFURIZATION PERFORMANCE

TECHNICAL FIELD

The present disclosure relates to a system and a method for controlling a portion of a wet flue gas desulfurization process. More particularly, the present disclosure relates to a system and a method for reducing nitrates and nitrites in a wet flue gas desulfurization purge stream through sulfite control during a wet flue gas desulfurization process.

BACKGROUND

Gas-liquid contactors, also referred to as absorbers, are capable of removing substances such as pollutant gases and particulate matter from flue gas produced by power plants. Sulfur dioxide ($SO_2$), for example, is produced by the combustion of fossil fuels. Sulfur dioxide emissions are of a particular concern since sulfur dioxide is known to be hazardous to the environment. Wet flue gas desulfurization (WFGD) is a process in which sulfur dioxide is removed from flue gas through flue gas contact with an alkaline slurry dispersed within a spray tower.

WFGD systems typically use calcium-based slurries, sodium-based solutions, or ammonia based solutions for flue gas contact to remove sulfur dioxide therefrom. A slurry is a mixture of solids and liquid. Examples of calcium-based slurries include for example limestone (calcium carbonate; $CaCO_3$) slurries and lime (calcium oxide; CaO) slurries. Such alkaline slurries react with flue gas acidic gases to form precipitates which can be collected for disposal or recycling. Hence, in WFGD systems, contact between the alkaline slurry and the flue gas acidic gases, such as for example sulfur dioxide, results in alkaline slurry absorption of at least a portion of the flue gas acidic gases to produce reacted slurry.

After WFGD of the flue gas, the reacted slurry is typically collected or accumulated in a tank, where the absorbed sulfur dioxide reacts with water to produce sulfites ($SO_3^{-2}$). The produced sulfites react with oxygen supplied to the reacted slurry to produce sulfates ($SO_4^{-2}$). This process ensuring that all of the sulfites react to form sulfates is referred to herein as forced oxidation. Disassociation of the lime or limestone within the reacted slurry provides calcium ions which react with the sulfates to produce gypsum ($CaSO_4$ $2H_2O$). The gypsum can be resold and used, for example, in wallboard for the home construction industry. Forced oxidation of the reacted slurry collected in the tank ensures that all of the sulfites react to form sulfates, thereby maximizing gypsum production.

A disadvantage of forced oxidation in WFGD systems is that measuring or estimating sulfite concentration in the reacted slurry is difficult. Because measuring or estimating sulfite concentration in the reacted slurry is difficult, controlling sulfite oxidation in the reacted slurry is likewise difficult. As a result, WFGD systems typically supply more than a sufficient amount of oxygen to the reacted slurry to ensure oxidation of generally all of the sulfite. Providing more than a sufficient amount of oxygen reduces the efficiency of the WFGD system because energy is required to supply the oxygen. Another disadvantage with known WFGD systems is that providing more than a sufficient amount of oxygen to the reacted slurry oxidizes essentially all of the sulfites to form sulfates, thus foregoing benefits provided by maintaining sulfites within the reacted slurry.

SUMMARY

In 2015, the United States established a regulation requiring a reduction of the 30-day average of nitrates and nitrites in a wet flue gas desulfurization (WFGD) purge stream to 4.4 mg/l prior to discharge. Unexpectedly, research showed total nitrates and nitrites decreased by more than 50% with reacted slurry sulfite control to maintain a relatively low sulfite concentration of about 5 ppm to about 80 ppm, or about 20 ppm to about 40 ppm within the reacted slurry, as compared to total nitrates and nitrites with forced oxidation, or full oxidation. Such result is unexpected since other species present in reacted slurry, such as for example, arsenic, iron, barium, cadmium and nickel, showed no significant change with sulfite control as compared to forced/full oxidation. Further, manganese and cobalt showed significant increase with sulfite control as compared to forced/full oxidation. Hence, based on the above-disclosed unexpected research results, disclosed herein is a WFGD system comprising a sulfite control system operable for reducing nitrates and nitrites in a wet flue gas desulfurization purge stream, or an at least partially reacted slurry. As such, the subject WFGD system includes a tank having an inlet for receiving an at least partially reacted slurry from WFGD of a flue gas. The tank also includes an inlet for receiving an oxygen-containing gas. The inlet for receiving the oxygen-containing gas is operable for dispersing at least a portion of the oxygen-containing gas supplied to the tank through at least a portion of the at least partially reacted slurry contained within the tank. The subject WFGD system also includes a sensor operable to measure a sulfite concentration of the at least partially reacted slurry in the tank to obtain a sulfite concentration measurement. In some embodiments, the sensor is a sulfite analyzer. In other embodiments, the sensor is a virtual analyzer. Further, the subject WFGD system includes a controller. Software executes on the controller to generate an electronic signal to affect adjustment of a flow rate of oxygen-containing gas into the tank based at least in part on the sulfite concentration measurement for effective reacted slurry nitrates and nitrites reduction.

Also, based on the above-disclosed unexpected research results, disclosed herein is a method for reducing nitrates and nitrites in a wet flue gas desulfurization purge stream, or an at least partially reacted slurry, comprising using a sulfite control system. Further, the subject method includes the steps of receiving the at least partially reacted slurry in a tank, wherein the at least partially reacted slurry comprises one or more sulfites. A flow of oxygen-containing gas is supplied to and dispersed through the at least partially reacted slurry in the tank. Next, the sulfite concentration of the at least partially reacted slurry is measured to obtain a sulfite concentration measurement. The flow rate of the oxygen-containing gas supplied to and dispersed through the at least partially reacted slurry in the tank is adjusted based at least in part on the sulfite concentration measurement.

In summary, the subject WFGD system for controlling oxidation of one or more sulfites to reduce nitrite and nitrate levels in an at least partially reacted slurry, comprises a tank having an inlet for receiving the at least partially reacted slurry and an inlet for receiving an oxygen-containing gas, the inlet for receiving the oxygen-containing gas operable for dispersal of at least a portion of the oxygen-containing gas received in the tank through at least a portion of the at least partially reacted slurry in the tank, a sensor operable to measure a sulfite concentration of the at least partially reacted slurry in the tank to obtain a sulfite concentration measurement, a controller, software executing on the controller for generating an electronic signal to affect adjustment of a flow rate of the oxygen-containing gas into the at least partially reacted slurry in the tank based at least in part on the sulfite concentration measurement to adjust oxidation of the one or more sulfites contained in the at least partially reacted slurry to a level less than 100% so as to maintain a relatively low sulfite concentration within the reacted slurry, thereby effectively reducing nitrite and nitrate levels in the at least partially reacted slurry. The electronic signal affecting adjustment of the flow rate of the oxygen-containing gas into the at least partially reacted slurry RS is based at least partially on a predetermined sulfite concentration of the at least partially reacted slurry. The at least partially reacted slurry in the tank is produced in a spray tower of the subject WFGD system, operable for wet flue gas desulfurization. The sensor of the subject WFGD system may comprise a sulfite analyzer. The sensor of the subject WFGD system may comprise a virtual analyzer. The tank of the subject WFGD system may be arranged in a structure separate from a spray tower structure in which the at least partially reacted slurry is produced or arranged in a common structure with the spray tower in which the at least partially reacted slurry is produced.

In summary, the subject method of controlling oxidation of one or more sulfites to reduce nitrite and nitrate levels in an at least partially reacted slurry comprises the steps of receiving the at least partially reacted slurry in a tank, with the at least partially reacted slurry comprising the one or more sulfites, supplying a flow of an oxygen-containing gas at a flow rate into the at least partially reacted slurry in the tank, measuring a sulfite concentration of the at least partially reacted slurry in the tank to obtain a sulfite concentration measurement, adjusting the flow rate of the oxygen-containing gas into the at least partially reacted slurry based at least in part on the sulfite concentration measurement to adjust the oxidation of the one or more sulfites contained in the at least partially reacted slurry to less than 100%, to effectively reduce nitrite and nitrate levels in the at least partially reacted slurry. Further according to the method, adjusting of the flow rate of the oxygen-containing gas is at least partially based on a predetermined sulfite concentration of the at least partially reacted slurry. According to the method, a sulfite analyzer or a virtual analyzer may be used for measuring sulfite concentration. Also according to the method, adjusting the flow rate of the oxygen-containing gas into the at least partially reacted slurry achieves sulfite oxidation of less than 100%, which is effective in reducing nitrite and nitrate levels in the at least partially reacted slurry by about 50% or greater. The at least partially reacted slurry comprises about 5 ppm to about 80 ppm, or about 20 ppm to about 40 ppm, of the one or more sulfites. The subject method may further comprise adjusting an alkaline slurry supply based on the sulfite concentration measurement to adjust the oxidation of the one or more sulfites contained in the at least partially reacted slurry to less than 100%, to effectively reduce nitrite and nitrate levels in the at least partially reacted slurry.

DESCRIPTION

Figure 1:
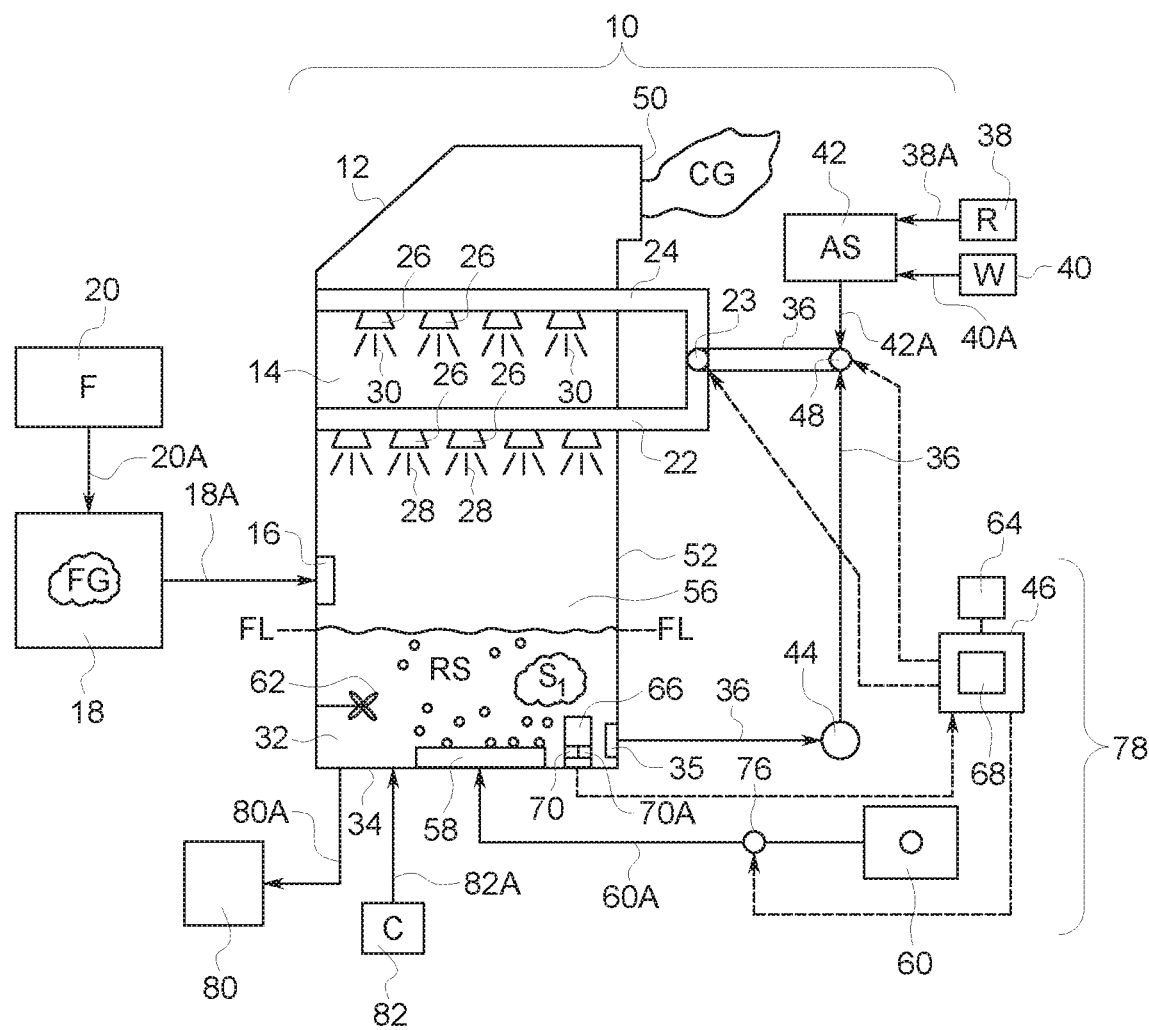
FIG. 1 is a schematic cross-sectional view of a first embodiment of a wet flue gas desulfurization system according to the subject disclosure.

FIG. 1 illustrates a first embodiment of a wet flue gas desulfurization (WFGD) system 10 comprising a spray tower 12 in accordance with the present disclosure. The spray tower 12, also referred to herein as an absorber, is an example of a gas-liquid contactor. However, the present disclosure is not limited to a spray tower 12, as other types of gas-liquid contactors can be employed. This disclosure is directed to scrubbing structures, and operations which serve to remove undesirable gases, mist, dust, fumes, smoke and/or particulate matter from a stream of gas, referred to herein as a flue gas FG. Although the disclosed WFGD system 10 and method of using the same are described herein in relation to specific embodiments of a spray tower 12, the disclosed WFGD system 10 and method of using the same are not limited in this regard. For example, the disclosed WFGD system 10 and method of using the same can be adapted to account for design variations in the spray tower 12, the operating conditions of the spray tower 12, and the properties of an alkaline slurry AS used in the spray tower 12, among other variables. Additionally, the disclosed WFGD system 10 can be used with other types of absorbers, including, but not limited to, tray towers and fountain spray towers. Any specific dimensions, values, or specific operating conditions included in this description, are provided to broadly illustrate the subject WFGD system 10 and method of using the same, and are not intended to limit the scope of this disclosure.

The spray tower 12 is generally an upright structure defining an interior tower cavity 14. The interior tower cavity 14 is in fluid communication with an inlet 16 for flue gas FG flow from a combustion process into the interior tower cavity 14. The flue gas FG generated by a combustion process, such as for example during combustion of one or more fossil fuels F in a combustion unit 18, flow into inlet 16 via duct 18A. Fossil fuels F are supplied from a fossil fuel supply 20 via duct 20A to the combustion unit 18. Flue gas FG generated by combustion of fossil fuels F flows from the combustion unit 18 via duct 18A into inlet 16 and interior tower cavity 14. Interior tower cavity 14 includes a first spray level arrangement 22 equipped with a plurality of nozzles 26 above the flue gas inlet 16. The first spray level arrangement 22 provides a spray 28 of alkaline slurry AS and/or at least partially reacted slurry RS from the plurality of nozzles 26 into the interior tower cavity 14. The spray tower 12 includes a second spray level arrangement 24 equipped with a plurality of nozzles 26 arranged above the first spray level arrangement 22. The second spray level arrangement 24 provides a spray 30 of alkaline slurry AS and/or at least partially reacted slurry RS from the plurality of nozzles 26 into interior tower cavity 14. Although the embodiment shown in FIG. 1 is disclosed as having a first spray level arrangement 22 and a second spray level arrangement 24, the present disclosure is not limited in this regard, and the number and arrangement of spray level arrangements within the spray tower 12 may vary for a given application.

During operation of the spray tower 12, alkaline slurry AS and/or at least partially reacted slurry RS is sprayed from nozzles 26 of the first spray level arrangement 22 and/or the second spray level arrangement 24 depending upon adjustment of flow valve 23 electronically affected by controller 46 as described in more detail below. At least a portion of the sprayed alkaline slurry AS and/or at least partially reacted slurry RS flows downwardly within the interior tower cavity 14 and received within tank 32 as a reacted slurry RS. As used herein, the term "flow" and derivations thereof, can also refer to any of a flowing, drifting or settling action of an atomized alkaline slurry AS and/or at least partially reacted slurry RS within the spray tower 12. As the sprayed alkaline slurry AS and/or at least partially reacted slurry RS flows downwardly in the interior tower cavity 14, the alkaline slurry AS and/or at least partially reacted slurry RS contacts flue gas FG flowing upwardly from inlet 16 within the interior tower cavity 14. Upon contact with the flue gas FG, the alkaline slurry AS and/or any unreacted portion of the at least partially reacted slurry RS reacts with flue gas FG pollutants, such as but not limited to flue gas FG sulfur dioxide. As a result, sulfur dioxide is absorbed by the alkaline slurry AS and/or any unreacted portion of the at least partially reacted slurry RS thereby producing at least partially reacted slurry RS. The contacted flue gas FG is at least partially desulfurized thereby producing a clean flue gas CG. Following contact with the flue gas FG, the produced at least partially reacted slurry RS is collected in tank 32 typically arranged in a base 34 of the spray tower 12. The tank 32 is in fluid communication with the first spray level arrangement 22 and second spray level arrangement 24 through outlet 35, one or more conduits 36, valve 48, and flow valve 23. A reagent supply 38 and a water supply 40 are fluidly connected via ducts 38A and 40A, respectively, to a slurry supply 42. As such, reagent supply 38 supplies a reagent R such as limestone and/or lime via duct 38A, and water supply 40 supplies water W via duct 40A to slurry supply 42. Slurry supply 42 is fluidly connected via duct 42A to valve 48, conduit 36, flow valve 23, first spray level arrangement 22 and second spray level arrangement 24, supplying alkaline slurry AS thereto. Likewise, tank 32 is fluidly connected via conduits 36, pump 44, valve 48, flow valve 23, first spray level arrangement 22 and second spray level arrangement 24, supplying at least partially reacted slurry RS from tank 32 thereto. As such, pump 44, in fluid communication with the conduits 36 and the first and second spray level arrangements 22, 24 pumps alkaline slurry AS from slurry supply 42 via duct 42A and/or at least partially reacted slurry RS from the tank 32, depending upon controller 46 adjustment of valve 48 as described in more detail below. The present disclosure is not limited to the specific arrangement illustrated in FIG. 1, as various different arrangements of the conduits 36, pump 44, valve 48, duct 42A, flow valve 23, and first and second spray level arrangements 22, 24 are possible.

Figure 3:
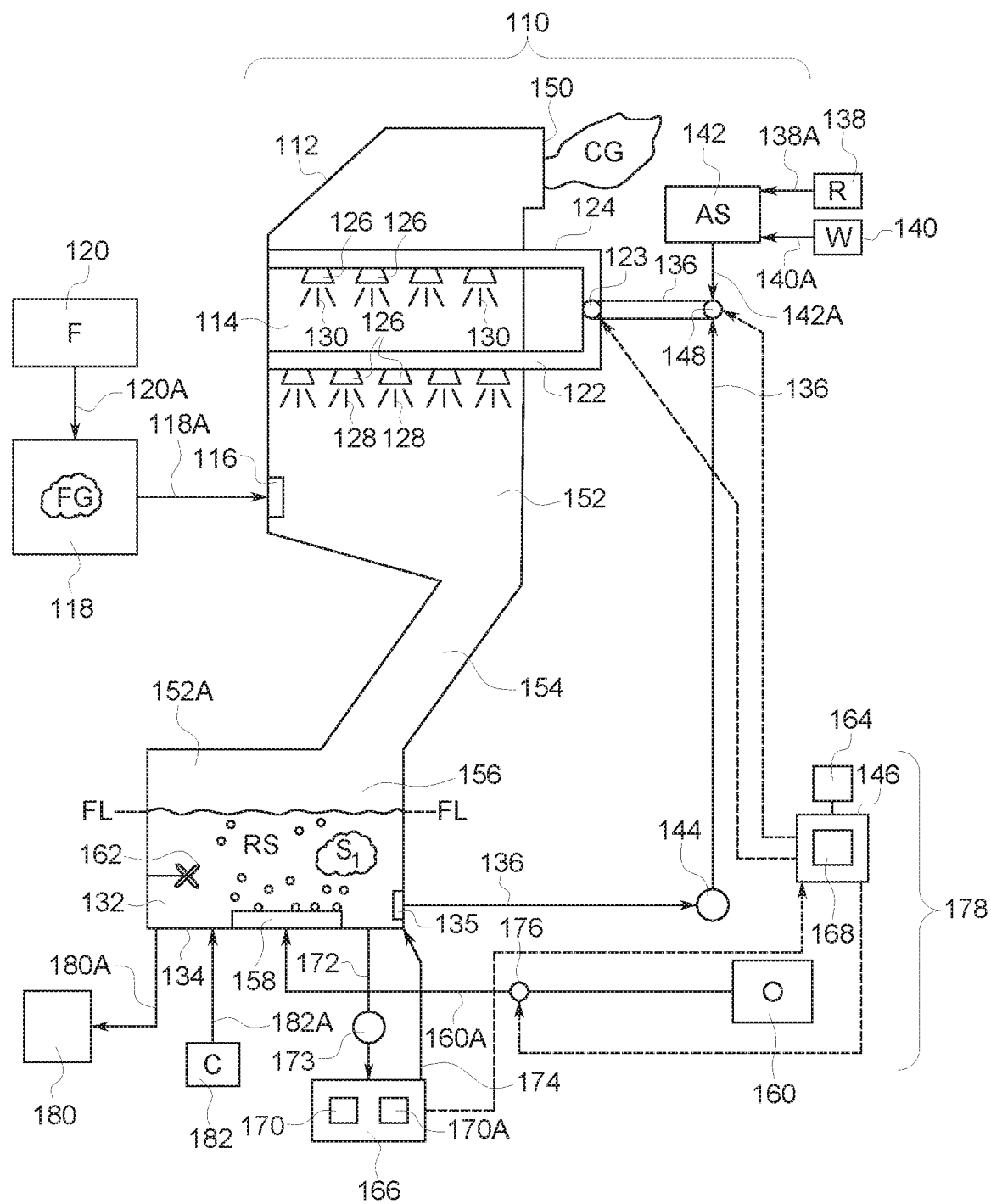
FIG. 3 is a schematic cross-sectional view of a second embodiment of a wet flue gas desulfurization system and sulfite control system according to the subject disclosure.

As described above, during flue gas FG desulfurization in WFGD system 10, sulfur dioxide in the flue gas FG reacts upon contact with calcium carbonate in the alkaline slurry AS and/or any unreacted portion of the at least partially reacted slurry RS circulated from tank 32 to form calcium sulfite. In forming calcium sulfite, sulfur dioxide, or at least a portion thereof, is removed from the flue gas FG thereby producing at least partially reacted slurry RS comprising calcium sulfite. Also produced is a clean flue gas CG of a reduced sulfur dioxide level as compared to that of flue gas FG generated in the combustion unit 18. The produced clean flue gas CG is exhausted from the spray tower 12 through an outlet 50. The produced at least partially reacted slurry RS is received in the tank 32. The tank 32 and the spray tower 12 typically reside in a single structure 52, as shown in FIG. 1, with no physical separation therebetween. However, the present disclosure is not limited in this regard. As illustrated in FIG. 3, the tank 132 and the spray tower 112 may reside in separate distinct structures 152, 152A fluidly connected by a conduit 154.

FIG. 3 illustrates a second embodiment of a wet flue gas desulfurization (WFGD) system 110 comprising a spray tower 112 in accordance with the present disclosure. The spray tower 112, also referred to herein as an absorber, is an example of a gas-liquid contactor. However, the present disclosure is not limited to a spray tower 112, as other types of gas-liquid contactors can be employed. This disclosure is directed to scrubbing structures, and operations which serve to remove undesirable gases, mist, dust, fumes, smoke and/or particulate matter from a stream of gas, referred to herein as a flue gas FG. Although the disclosed WFGD system 110 and method of using the same are described herein in relation to specific embodiments of a spray tower 112, the disclosed WFGD system 110 and method of using the same are not limited in this regard. For example, the disclosed WFGD system 110 and method of using the same can be adapted to account for design variations in the spray tower 112, the operating conditions of the spray tower 112, and the properties of an alkaline slurry AS used in the spray tower 112, among other variables. Additionally, the disclosed WFGD system 110 can be used with other types of absorbers, including, but not limited to, tray towers and fountain spray towers. Any specific dimensions, values, or specific operating conditions included in this description, are provided to broadly illustrate the subject WFGD system 110 and method of using the same, and are not intended to limit the scope of this disclosure.

The spray tower 112 is generally an upright structure defining an interior tower cavity 114. The interior tower cavity 114 is in fluid communication with an inlet 116 for flue gas FG flow from a combustion process into the interior tower cavity 114. The flue gas FG generated by a combustion process, such as for example during combustion of one or more fossil fuels F in a combustion unit 118, flow into inlet 116 via duct 118A. Fossil fuels F are supplied from a fossil fuel supply 120 via duct 120A to the combustion unit 118. Flue gas FG generated by combustion of fossil fuels F flows from the combustion unit 118 via duct 118A into inlet 116 and interior tower cavity 114. Interior tower cavity 114 includes a first spray level arrangement 122 equipped with a plurality of nozzles 126 above the flue gas inlet 116. The first spray level arrangement 122 provides a spray 128 of alkaline slurry AS and/or at least partially reacted slurry RS from the plurality of nozzles 126 into the interior tower cavity 114. The spray tower 112 includes a second spray level arrangement 124 equipped with a plurality of nozzles 126 arranged above the first spray level arrangement 122. The second spray level arrangement 124 provides a spray 130 of alkaline slurry AS and/or at least partially reacted slurry RS from the plurality of nozzles 126 into interior tower cavity 114. Although the embodiment shown in FIG. 3 is disclosed as having a first spray level arrangement 122 and a second spray level arrangement 124, the present disclosure is not limited in this regard, and the number and arrangement of spray level arrangements within the spray tower 112 may vary for a given application.

During operation of the spray tower 112, alkaline slurry AS and/or at least partially reacted slurry RS is sprayed from nozzles 126 of the first spray level arrangement 122 and/or the second spray level arrangement 124 depending upon adjustment of flow valve 123 electronically affected by controller 146 as described in more detail below. At least a portion of the sprayed alkaline slurry AS and/or at least partially reacted slurry RS flows downwardly within the interior tower cavity 114 and received within tank 132 in structure 152A via conduit 154 and inlet 156, as a reacted slurry RS. As used herein, the term "flow" and derivations thereof, can also refer to any of a flowing, drifting or settling action of an atomized alkaline slurry AS and/or at least partially reacted slurry RS within the spray tower 112. As the sprayed alkaline slurry AS and/or at least partially reacted slurry RS flows downwardly in the interior tower cavity 114, the alkaline slurry AS and/or at least partially reacted slurry RS contacts flue gas FG flowing upwardly from inlet 116 within the interior tower cavity 114. Upon contact with the flue gas FG, the alkaline slurry AS and/or any unreacted portion of the at least partially reacted slurry RS reacts with flue gas FG pollutants, such as but not limited to flue gas FG sulfur dioxide. As a result, sulfur dioxide is absorbed by the alkaline slurry AS and/or any unreacted portion of the at least partially reacted slurry RS thereby producing at least partially reacted slurry RS. The contacted flue gas FG is at least partially desulfurized thereby producing a clean flue gas CG. Following contact with the flue gas FG, the produced at least partially reacted slurry RS is collected in tank 132 typically arranged in a base 134 of structure 152A fluidly connected via conduit 154 to structure 152 housing the spray tower 112. The tank 132 is in fluid communication with the first spray level arrangement 122 and second spray level arrangement 124 through outlet 135, one or more conduits 136, valve 148, and flow valve 123. A reagent supply 138 and a water supply 140 are fluidly connected via ducts 138A and 140A, respectively, to a slurry supply 142. As such, reagent supply 138 supplies a reagent R such as limestone and/or lime via duct 138A, and water supply 140 supplies water W via duct 140A to slurry supply 142. Slurry supply 142 is fluidly connected via duct 142A to valve 148, conduit 136, flow valve 123, first spray level arrangement 122 and second spray level arrangement 124, supplying alkaline slurry AS thereto. Likewise, tank 132 is fluidly connected via conduits 136, pump 144, valve 148, flow valve 123, first spray level arrangement 122 and second spray level arrangement 124, supplying at least partially reacted slurry RS from tank 132 thereto. As such, pump 144, in fluid communication with the conduits 136 and the first and second spray level arrangements 122, 124 pumps alkaline slurry AS from slurry supply 142 via duct 142A and/or at least partially reacted slurry RS from the tank 132, depending upon controller 146 adjustment of valve 148 as described in more detail below. The present disclosure is not limited to the specific arrangement illustrated in FIG. 3, as various different arrangements of the conduits 136, pump 144, valve 148, duct 142A, flow valve 123, and first and second spray level arrangements 122, 124 are possible.

As described above, during flue gas FG desulfurization in WFGD system 110, sulfur dioxide in the flue gas FG reacts upon contact with calcium carbonate in the alkaline slurry AS and/or any unreacted portion of the at least partially reacted slurry RS circulated from tank 132 to form calcium sulfite. In forming calcium sulfite, sulfur dioxide, or at least a portion thereof, is removed from the flue gas FG thereby producing at least partially reacted slurry RS comprising calcium sulfite. Also produced is a clean flue gas CG of a reduced sulfur dioxide level as compared to that of flue gas FG generated in the combustion unit 118. The produced clean flue gas CG is exhausted from the spray tower 112 through an outlet 150. The produced at least partially reacted slurry RS is received in the tank 132. The tank 132 and the spray tower 112 reside in separate distinct structures 152, 152A fluidly connected by a conduit 154.

Figure 2:
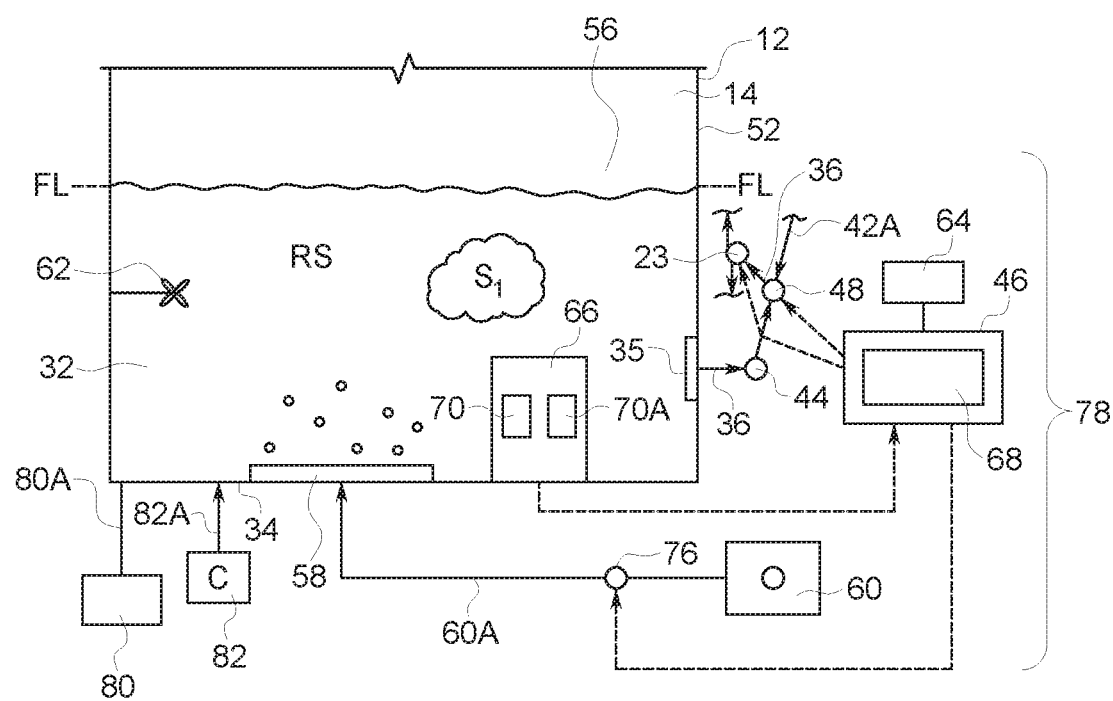
FIG. 2 is an enlarged schematic cross-sectional view of the sulfite control system of FIG. 1.

FIG. 2 is an enlarged schematic view of the sulfite control system 78 of FIG. 1. The tank 32 receives at least partially reacted slurry RS from the spray tower 12 as the at least partially reacted slurry RS flows downwardly. As such, the tank 32 includes an inlet 56 for receiving the at least partially reacted slurry RS. In the embodiment illustrated in FIG. 2, the inlet 56 is defined by the cross-section of the interior tower cavity 14. However, the present disclosure is not limited in this regard. As illustrated in FIG. 3, the inlet 156 may comprise a conduit 154 in fluid communication with separate distinct structures 152, 152A comprising spray tower 112 interior tower cavity 114 and tank 132, respectively.

Illustrated in FIGS. 1-3, tank 32, 132 includes a gas inlet 58, 158 for receiving an oxygen-containing gas O from a fluidly connected gas supply 60, 160 via duct 60A, 160A. In the embodiments shown in FIGS. 1-3, the gas inlet 58, 158 is located below a static fluid line FL-FL of the at least partially reacted slurry RS collected in the tank 32, 132. This configuration allows at least a portion of the oxygen-containing gas O supplied to the tank 32, 132 to be dispersed throughout at least a portion of the at least partially reacted slurry RS collected in the tank 32, 132. Gas supply 60, 160 supplying pressurized oxygen-containing gas O to tank 32, 132 is in fluid communication with tank 32, 132 via duct 60A, 160A. Gas supply 60, 160 supplying oxygen-containing gas O to tank 32, 132 may be, for example, a blower capable of providing oxygen-containing gas O at a continuous pressure, or a variable pressure, above atmospheric pressure. The oxygen-containing gas O is a gas comprising oxygen for oxidation of the one or more sulfites in the at least partially reacted slurry RS. The tank 32, 132 further includes an agitator 62, 162 operable for distributing the oxygen-containing gas O supplied through the inlet 58, 158 through the at least partially reacted slurry RS collected in the tank 32, 132. Although the embodiments shown in FIGS. 1-3 include an agitator 62, 162, the present disclosure is not limited in this regard. The subject WFGD system 10, 110 with sulfite control system 78, 178 and subject method may be practiced without an agitator 62, 162.

As illustrated in FIGS. 1-3, the WFGD system 10, 110 includes a controller 46, 146. The controller 46, 146 according to the present disclosure, comprises one or more devices operable for executing software 68, 168. As can be appreciated by a person of ordinary skill in the art, many different devices are commercially available for use as the controller 46, 146. For example, one or more processor based computers may be used as the controller 46, 146. The controller 46, 146 includes an interface 64, 164 for inputting information indicative of desired operating conditions of the spray tower 12, 112. For example, a predetermined sulfite concentration of the at least partially reacted slurry RS collected in tank 32 of spray tower 12, 112 may be input into the controller 46, 146 via the interface 64, 164. The interface 64, 164 is in electronic communication with the controller 46, 146. Although the controller 46, 146 and the interface 64, 164 are disclosed as separate devices in FIGS. 1-3, the present disclosure is not limited in this regard. As can be appreciated by a person of ordinary skill in the art, the interface 64, 164 may be a component comprised by the controller 46, 146. In yet other embodiments, it is not necessary to include an interface 64, 164. In such embodiments, predetermined parameters may be programmed into the controller 46, 146, or may be electronically transmitted to the controller 46, 146 by some other means or associated device.

As illustrated in FIG. 1 and FIG. 2, the WFGD system 10 further includes at least one sulfite sensor 66 operable for measuring a sulfite concentration $S_1$ of the at least partially reacted slurry RS collected in the tank 32. The sulfite sensor 66 is positioned at least partially submerged below the static fluid line FL-FL of the at least partially reacted slurry RS collected in the tank 32. The sulfite sensor 66 measures the sulfite concentration $S_1$ of the at least partially reacted slurry RS received in the tank 32 to obtain a sulfite concentration measurement. The sulfite sensor 66 transmits an electronic signal indicative of the sulfite concentration measurement to the controller 46. Based on the sulfite sensor's 66 electronic signal transmitted to and received by the controller 46, software 68 executing on the controller 46 determines the sulfite concentration $S_1$/sulfite concentration measurement of the at least partially reacted slurry RS collected in the tank 32 as compared to a predetermined sulfite concentration. The combination of the sulfite sensor 66 and the controller 46 can be referred to in combination as a sulfite analyzer 70. In some embodiments, the sulfite analyzer 70 can provide real time sulfite concentration measurements of the at least partially reacted slurry RS collected in the tank 32. In further embodiments, the sulfite analyzer 70 can provide real time and continuous sulfite concentration measurements of the at least partially reacted slurry RS collected in the tank 32. Sulfite analyzer 70 in accordance with the present disclosure is described in EP Patent No. 2579032 entitled, "Sulphite Sensor and Method for Measuring Sulphite Concentration in a Substance". EP Patent No. 2579032 is incorporated herein in its entirety by reference. In some embodiments, a virtual sulfite analyzer 70A is used to obtain a sulfite concentration measurement of the at least partially reacted slurry RS collected in the tank 32. An example of such a virtual analyzer 70A is disclosed in U.S. Pat. No. 7,113,835 to Boyden et al., incorporated herein in its entirety by reference.

Although FIGS. 1 and 2 disclose that the sulfite sensor 66 is positioned inside the tank 32, the present disclosure is not limited in this regard. For example, in reference to FIG. 3, the sulfite sensor 166 may be positioned outside of the tank 132. When positioned outside of the tank 132, the sulfite sensor 166 is in communication with the tank 132 by a first conduit 172 and a second conduit 174. As such, at least partially reacted slurry RS is pumped via pump 173 through the first conduit 172, past the sulfite sensor 166, through the second conduit 174, and back into the tank 132. The tank 132 may include an agitator 162. The WFGD system 110 illustrated in FIG. 3 also includes a controller 146, software 168 executing thereon, an inlet 158 and a duct 160A through which pressurized oxygen-containing gas O is supplied from gas supply 160 to the at least partially reacted slurry RS collected in the tank 132. A valve 176, adjustment of which is electronically controlled by controller 146, is arranged in duct 160A and operable for controlling the flow of oxygen-containing gas O to the tank 132. The combination of the sulfite sensor 166 and the controller 146 can be referred to in combination as a sulfite analyzer 170. In some embodiments, the sulfite analyzer 170 can provide real time sulfite concentration measurements of the at least partially reacted slurry RS collected in the tank 132. In further embodiments, the sulfite analyzer 170 can provide real time and continuous sulfite concentration measurements of the at least partially reacted slurry RS collected in the tank 132. A sulfite analyzer 170 in accordance with the present disclosure is described in EP Patent No. 2579032 entitled, "Sulphite Sensor and Method for Measuring Sulphite Concentration in a Substance". EP Patent No. 2579032 is incorporated herein in its entirety by reference. In some embodiments, a virtual sulfite analyzer 170A is used to obtain a sulfite concentration measurement of the at least partially reacted slurry RS collected in the tank 132. An example of such a virtual analyzer 170A is disclosed in U.S. Pat. No. 7,113,835 to Boyden et al., incorporated herein in its entirety by reference. The present disclosure is not limited to the specific arrangements of the sulfite control system 78, 178 illustrated in FIGS. 1-3, as various different arrangements of the WFGD system 10, 110 with sulfite control system 78, 178 to achieve oxidation control become apparent to those skilled in the art in view of the subject disclosure.

During operation of the WFGD system 10, 110 with sulfite control system 78, 178 illustrated in FIGS. 1-3, the controller 46, 146 of the WFGD system 10, 110 may control oxidation level of the one or more sulfites in the at least partially reacted slurry RS collected in the tank 32, 132 by affecting adjustment of the valve 76, 176 from open to closed positions, or positions therebetween, to control the flow rate of oxygen-containing gas O supplied to the at least partially reacted slurry RS collected in the tank 32, 132. As disclosed above, a predetermined sulfite concentration is received in the controller 46, 146, for example, via the interface 64, 164. The sulfite sensor 66, 166 measures a sulfite concentration $S_1$ in the at least partially reacted slurry RS collected in the tank 32, 132 to obtain a sulfite concentration measurement. Software 68, 168 executing on the controller 46, 146 generates an electronic signal affecting an adjustment of the valve 76, 176 thereby adjusting flow rate of the oxygen-containing gas O supplied to the at least partially reacted slurry RS collected in the tank 32, 132 based at least in part on the sulfite concentration $S_1$/sulfite concentration measurement. For example, if the sulfite concentration $S_1$/sulfite concentration measurement is greater than the predetermined sulfite concentration, software 68, 168 executing on the controller 46, 146 generates an electronic signal to affect adjustment of the valve 76, 176 to a more open position, thus providing more oxygen-containing gas O to the at least partially reacted slurry RS and increasing the oxidation level thereof. Conversely, if the sulfite concentration $S_1$/sulfite concentration measurement is less than the predetermined sulfite concentration, software 68, 168 executing on the controller 46, 146 generates an electronic signal to affect adjustment of the valve 76, 176 to a more closed position, thus providing less oxygen-containing gas O to the at least partially reacted slurry RS and decreasing the oxidation level thereof. To the extent that the predetermined sulfite concentration is equivalent to the sulfite concentration $S_1$/sulfite concentration measurement, software 68, 168 executing on the controller 46, 146 will generate no electronic signal. Hence, with no electronic signal, the valve 76, 176 is not adjusted thereby maintaining the flow of oxygen-containing gas O to the at least partially reacted slurry RS constant so as to continue the current oxidation level thereof. As described, the disclosed WFGD system 10, 110 and method of using the same can precisely control the oxidation level of the one or more sulfites in the at least partially reacted slurry RS collected in the tank 32, 132.

Likewise, during operation of the WFGD system 10, 110 illustrated in FIGS. 1-3, the controller 46, 146 of the WFGD system 10, 110 may control the sulfite concentration $S_1$/sulfite concentration measurement in the at least partially reacted slurry RS collected in the tank 32, 132 by affecting adjustment of the valve 48, 148 from open to closed positions, or positions therebetween, to control the supply of alkaline slurry AS and/or the at least partially reacted slurry RS collected in the tank 32, 132 through outlet 35, 135 to the first spray level arrangement 22, 122 and/or second spray level arrangement 24, 124. As disclosed above, a predetermined sulfite concentration $S_1$ is received in the controller 46, 146, for example, via the interface 64, 164. The sulfite sensor 66, 166 measures a sulfite concentration $S_1$ in the at least partially reacted slurry RS collected in the tank 32, 132 to obtain a sulfite concentration measurement. Software 68, 168 executing on the controller 46, 146 generates an electronic signal affecting adjustment of the valve 48, 148 thereby adjusting the supply rate and/or the supply ratio of alkaline slurry AS and/or at least partially reacted slurry RS to the first spray level arrangement 22, 122 and/or second spray level arrangement 24, 124. This adjustment in the supply rate and/or the supply ratio of alkaline slurry AS and/or the at least partially reacted slurry RS is based at least in part on the sulfite sensor 66, 166 obtained sulfite concentration measurement of the sulfite concentration $S_1$ of the at least partially reacted slurry RS in tank 32, 132. For example, if the sulfite concentration $S_1$/sulfite concentration measurement is greater than the predetermined sulfite concentration, software 68, 168 executing on the controller 46, 146 generates an electronic signal to affect adjustment of the valve 48, 148 to a more closed position with respect to the supply of alkaline slurry AS, the supply of at least partially reacted slurry RS, or both, thus supplying less alkaline slurry AS and/or at least partially reacted slurry RS to the first spray level arrangement 22, 122 and/or second spray level arrangement 24, 124, thereby decreasing the sulfite concentration $S_1$ thereof. Conversely, if the sulfite concentration $S_1$/sulfite concentration measurement is less than the predetermined sulfite concentration, software 68, 168 executing on the controller 46, 146 generates an electronic signal to affect adjustment of the valve 48, 148 to a more open position with respect to the supply of alkaline slurry AS, the supply of at least partially reacted slurry RS, or both, thus supplying more alkaline slurry AS and/or at least partially reacted slurry RS to the first spray level arrangement 22, 122 and/or second spray level arrangement 24, 124, thereby increasing the sulfite concentration $S_1$ thereof. To the extent that the predetermined sulfite concentration $S_1$ is equivalent to the sulfite concentration $S_1$/sulfite concentration measurement, software 68, 168 executing on the controller 46, 146 will generate no electronic signal. Hence, with no electronic signal, the valve 48, 148 is not adjusted thereby maintaining the supply rate and/or the supply ratio of the alkaline slurry AS and/or at least partially reacted slurry RS to the first spray level arrangement 22, 122 and/or second spray level arrangement 24, 124, and thereby the sulfite concentration $S_1$, constant. As described, the disclosed WFGD system 10, 110 with sulfite control system 78, 178 and method of using the same can precisely control the sulfite concentration $S_1$ of the at least partially reacted slurry RS collected in the tank 32, 132.

Likewise, during operation of the WFGD system 10, 110 illustrated in FIGS. 1-3, supply of alkaline slurry AS and/or at least partially reacted slurry RS to the first spray level arrangement 22, 122 and/or the second spray level arrangement 24, 124 is dependent upon adjustment of flow valve 23, 123 electronically affected by controller 46, 146. As such, controller 46, 146 may control the sulfite concentration $S_1$/sulfite concentration measurement of the at least partially reacted slurry RS collected in the tank 32, 132 by affecting adjustment of the valve 23, 123. The controller 46, 146 of the WFGD system 10, 110 affecting adjustment of the valve 23, 123 from open to closed positions, or positions therebetween, controls the supply of alkaline slurry AS and/or at least partially reacted slurry RS to the first spray level arrangement 22, 122 and/or second spray level arrangement 24, 124. As disclosed above, a predetermined sulfite concentration $S_1$ is received in the controller 46, 146, for example, via the interface 64, 164. The sulfite sensor 66, 166 measures a sulfite concentration $S_1$ in the at least partially reacted slurry RS collected in the tank 32, 132 to obtain a sulfite concentration measurement. Software 68, 168 executing on the controller 46, 146 generates an electronic signal affecting adjustment of the valve 23, 123 thereby adjusting the supply of alkaline slurry AS and/or at least partially reacted slurry RS to the first spray level arrangement 22, 122 and/or second spray level arrangement 24, 124. Valve 23, 123 enables independent operation of each first spray level arrangement 22, 122 and second spray level arrangement 24, 124. Controller 46, 146 adjustment in the supply of alkaline slurry AS and/or the at least partially reacted slurry RS is based at least in part on the sulfite sensor 66, 166 obtained sulfite concentration measurement of the sulfite concentration $S_1$ of the at least partially reacted slurry RS in tank 32, 132. For example, if the sulfite concentration $S_1$/sulfite concentration measurement is greater than the predetermined sulfite concentration, software 68, 168 executing on the controller 46, 146 generates an electronic signal to affect adjustment of the valve 23, 123 to a more closed position with respect to the supply of alkaline slurry AS and/or at least partially reacted slurry RS to the first spray level arrangement 22, 122 and/or the second spray level arrangement 24, 124. Adjustment of the valve 23, 123 to a more closed position with respect to the supply of alkaline slurry AS and/or at least partially reacted slurry RS reduces such supply to the first spray level arrangement 22, 122 and/or the second spray level arrangement 24, 124, and/or eliminates supply to either the first spray level arrangement 22, 122 or the second spray level arrangement 24, 124, thereby decreasing the sulfite concentration $S_1$ of the at least partially reacted slurry RS in the tank 32, 132. Conversely, if the sulfite concentration $S_1$/sulfite concentration measurement is less than the predetermined sulfite concentration, software 68, 168 executing on the controller 46, 146 generates an electronic signal to affect adjustment of the valve 23, 123 to a more open position with respect to the supply of alkaline slurry AS and/or at least partially reacted slurry RS to the first spray level arrangement 22, 122 and/or the second spray level arrangement 24, 124. Adjustment of the valve 23, 123 to a more open position with respect to the supply of alkaline slurry AS and/or at least partially reacted slurry RS increases such supply to the first spray level arrangement 22, 122 and/or the second spray level arrangement 24, 124, and/or begins supply to either the first spray level arrangement 22, 122 or the second spray level arrangement 24, 124, thereby increasing the sulfite concentration $S_1$ of the at least partially reacted slurry RS in the tank 32, 132. To the extent that the predetermined sulfite concentration $S_1$ is equivalent to the sulfite concentration $S_1$/sulfite concentration measurement, software 68, 168 executing on the controller 46, 146 will generate no electronic signal. Hence, with no electronic signal, the valve 23, 123 is not adjusted thereby maintaining the supply of the alkaline slurry AS and/or at least partially reacted slurry RS to the first spray level arrangement 22, 122 and/or second spray level arrangement 24, 124, and thereby maintaining constant the sulfite concentration $S_1$. As described, the disclosed WFGD system 10, 110 with sulfite control system 78, 178 and method of using the same can precisely control the sulfite concentration $S_1$ of the at least partially reacted slurry RS collected in the tank 32, 132.

According to the present disclosure, the predetermined oxidation of the at least partially reacted slurry RS in the tank 32, 132 is less than 100% of the sulfite contained therein. Unexpectedly, research showed total nitrates and nitrites decreased by more than 50% with reacted slurry sulfite control to maintain a relatively low sulfite concentration of about 5 ppm to about 80 ppm, or about 20 ppm to about 40 ppm within the reacted slurry, as compared to total nitrates and nitrites with forced oxidation, or full oxidation of sulfites. Such result was unexpected since other species present in reacted slurry, such as for example, arsenic, iron, barium, cadmium and nickel, showed no significant change with sulfite control as compared to full oxidation. Further, manganese and cobalt showed significant increase with sulfite control as compared to full oxidation. Hence, based on the above-disclosed unexpected research results, the subject WFGD system 10, 110 comprises a sulfite control system 78, 178 operable for reducing nitrates and nitrites in a wet flue gas desulfurization purge stream, i.e., an at least partially reacted slurry RS. Maintaining some level of sulfites in the at least partially reacted slurry RS is beneficial to control nitrate and nitrite levels in the at least partially reacted slurry RS for compliance with government nitrite and nitrate discharge regulations. As such, with WFGD system 10, 110 operated with sulfite control system 78, 178 control of sulfite concentration S1 in the at least partially reacted slurry RS to about 5 ppm to about 80 ppm, or about 20 ppm to about 40 ppm, total nitrates and nitrites in the at least partially reacted slurry RS may be reduced by about 50%. By reducing nitrates and nitrites by about 50% in the at least partially reacted slurry RS, capacity of the waste water treatment system (WWTS) 80, 180 fluidly connected to tank 32, 132 via duct 80A, 180A may be reduced, thereby reducing capital costs associated therewith while achieving nitrites/nitrates level regulatory compliance. Additionally, by reducing total nitrates and nitrites in the at least partially reacted slurry RS, costly biological treatment steps or other such steps used to reduce nitrates and nitrites in the at least partially reacted slurry RS are reduced or eliminated, thereby reducing operating costs associated therewith while achieving nitrites/nitrates level regulatory compliance.

In some embodiments, it is possible to increase the sulfite concentration $S_1$ of the at least partially reacted slurry RS in tank 32, 132 by addition of a cation C, such as magnesium, via a fluidly connected cation supply 82, 182 and a cation supply duct 82A/182A. Typically, the cation C is added in an amount in excess of inert anions in the at least partially reacted slurry RS, such as chlorides, which accumulate with the cation C instead of the sulfites. Increased sulfite concentration $S_1$ within the at least partially reacted slurry RS may be permitted without causing limestone binding by adding cations C of ammonia, sodium or magnesium to the at least partially reacted slurry RS.

The present disclosure further relates to a method of controlling oxidation of sulfites to reduce nitrite and nitrate levels in the at least partially reacted RS slurry. The method includes the steps of receiving a at least partially reacted slurry RS in a tank 32, 132, wherein the at least partially reacted slurry RS comprises one or more sulfites. An oxygen-containing gas O is supplied to the at least partially reacted slurry RS collected in the tank 32, 132. Next, the sulfite concentration $S_1$ of the at least partially reacted slurry RS in the tank 32, 132 is measured by a sensor 66, 166 to obtain a sulfite concentration measurement. In some embodiments, this step is performed using sulfite analyzer 70, 170. In other embodiments, this step is performed using a virtual analyzer 70A, 170A. Next, the supply of oxygen-containing gas O to the at least partially reacted slurry RS in the tank 32, 132 is adjusted based at least in part on the sulfite concentration $S_1$/sulfite concentration measurement.

In summary, the subject WFGD system 10, 110 with sulfite control system 78, 178 for controlling oxidation of sulfites to reduce total nitrite and nitrate levels in an at least partially reacted slurry RS, comprises a tank 32, 132 having an inlet 56, 156 for receiving the at least partially reacted slurry RS and an inlet 58, 158 for receiving an oxygen-containing gas O, the inlet 58, 158 for receiving the oxygen-containing gas O operable for dispersal of at least a portion of the oxygen-containing gas O received in the tank 32, 132 through at least a portion of the at least partially reacted slurry in the tank 32, 132, a sensor 66, 166 operable to measure a sulfite concentration $S_1$ of the at least partially reacted slurry RS in the tank 32, 132 to obtain a sulfite concentration measurement, a controller 46, 146, software 68, 168 executing on the controller 46, 146 for generating an electronic signal to affect adjustment of a flow rate of the oxygen-containing gas O into the at least partially reacted slurry RS in the tank 32, 132 based at least in part on the sulfite concentration $S_1$/sulfite concentration measurement to adjust oxidation rate of one or more sulfites contained in the at least partially reacted slurry RS to less than 100% effective to reduce nitrite and nitrate levels in the at least partially reacted slurry RS. The electronic signal affecting adjustment of a flow rate of the oxygen-containing gas O into the at least partially reacted slurry RS is based at least partially on a predetermined sulfite concentration of the at least partially reacted slurry RS. The at least partially reacted slurry RS in the tank 32, 132 is produced in a spray tower 12, 112 of the subject WFGD system 10, 110, operable for wet flue gas desulfurization of a flue gas FG. The sensor 66, 166 of the subject WFGD system 10, 110 may comprise a sulfite analyzer 70, 170. The sensor 66, 166 of the subject WFGD system 10, 110 may comprise a virtual analyzer 70A, 170A. The tank 132 of the subject WFGD system 110 is arranged in a structure 152A separate from a spray tower 112 structure 152 in which the at least partially reacted slurry RS is produced. Alternatively, tank 32 is arranged in a common structure 52 with that of the spray tower 12, in which the at least partially reacted slurry RS is produced.

In summary, the subject method of controlling oxidation of one or more sulfites to reduce total nitrite and nitrate levels in an at least partially reacted slurry RS comprises the steps of receiving the at least partially reacted slurry RS in a tank 32, 132, with the at least partially reacted slurry RS comprising the one or more sulfites, supplying an oxygen-containing gas O at a flow rate into the at least partially reacted slurry RS in the tank 32, 132, measuring a sulfite concentration $S_1$ of the at least partially reacted slurry RS in the tank 32, 132 to obtain a sulfite concentration measurement, adjusting the flow rate of the oxygen-containing gas O into the at least partially reacted slurry RS based at least partially on the sulfite concentration $S_1$/sulfite concentration measurement to adjust oxidation of the one or more sulfites contained within the at least partially reacted slurry RS to less than 100%, effective to reduce total nitrite and nitrate levels in the at least partially reacted slurry. Further according to the method, adjusting of the flow rate of the oxygen-containing gas O is at least partially based on a predetermined sulfite concentration of the at least partially reacted slurry RS. According to the method, a sulfite analyzer 70, 170 or a virtual analyzer 70A, 170A may be used for measuring sulfite concentration $S_1$. Also according to the method, adjusting the flow rate of the oxygen-containing gas O into the at least partially reacted slurry RS achieves an oxidation rate less than 100%, which is effective in reducing nitrite and nitrate levels in the at least partially reacted slurry RS by about 50% or greater. The at least partially reacted slurry RS comprises about 5 ppm to about 85 ppm, or about 20 ppm to about 40 ppm, of the one or more sulfites. The subject method may further comprise adjusting alkaline slurry AS supply based at least partially on the sulfite concentration $S_1$/sulfite concentration measurement to adjust the oxidation of the one or more sulfites contained in the at least partially reacted slurry RS to less than 100%, effective to reduce total nitrite and nitrate levels in the at least partially reacted slurry RS.

Although the present disclosure has been described with reference to certain embodiments thereof, it should be noted that other variations and modifications may be made, within the true scope of this disclosure.

The invention claimed is:

1. A system for controlling oxidation of sulfites to reduce total nitrite and nitrate levels in a slurry, comprising:
a tank for receiving a slurry and having an inlet for receiving a gas, the inlet for receiving the gas configured for dispersal of at least a portion of the gas through at least a portion of the slurry in the tank;
a sensor configured to measure a sulfite concentration $S_1$ of the slurry in the tank to obtain a sulfite concentration measurement;
a controller configured to adjust a flow rate of the gas into the slurry in the tank in dependence upon the sulfite concentration $S_1$/sulfite concentration measurement to adjust oxidation of the sulfite contained in the slurry to less than 100%, effective to reduce nitrite and nitrate levels in the slurry.

2. The system of claim 1, wherein the controller is configured to adjust the flow rate of the gas into the slurry based on a predetermined sulfite concentration of the slurry.

3. The system of claim 1, wherein the gas is an oxygen-containing gas.

4. The system of claim 1, further comprising:
a spray tower configured to provide for wet flue gas desulfurization of a flue gas provided to the spray tower;
wherein the slurry in the tank is produced via the wet flue gas desulfurization of the flue gas.

5. The system of claim 1, wherein the sensor comprises a sulfite analyzer.

6. The system of claim 1, wherein the sensor comprises a virtual analyzer.

7. The system of claim 4, wherein the tank is in a structure separate from the spray tower structure in which the slurry is produced; and
wherein the tank and the spray tower are fluidly interconnected via a conduit.

8. The system of claim 1, further comprising:
a spray tower in fluid communication with the tank;
a supply of alkaline slurry;
at least one conduit providing for fluid communication with the slurry in the tank;
a plurality of nozzles configured to disperse the alkaline slurry from the supply and/or the slurry from the tank into an interior of the spray tower.

9. The system of claim 8, wherein:
the controller is configured to adjust a supply rate and/or supply ratio of alkaline slurry and/or slurry from the tank to the plurality of nozzles in dependence upon the sulfite concentration $S_1$/sulfite concentration measurement.

10. The system of claim 8, wherein:
the plurality of nozzles are arranged in at least a first nozzle array and a second nozzle array;
wherein the first nozzle array is located above the second nozzle array; and
wherein the controller is configured to adjust a supply of the alkaline slurry and/or slurry from the tank to the first nozzle array and/or the second nozzle array in dependence upon the sulfite concentration $S_1$/sulfite concentration measurement.

11. A method of controlling oxidation of sulfites to reduce total nitrite and nitrate levels in a slurry comprising the steps of:
receiving a slurry in a tank, the slurry comprising one or more sulfites;
supplying a flow of a gas at a flow rate into the slurry in the tank;
measuring with a sensor a sulfite concentration of the slurry in the tank to obtain a sulfite concentration measurement; and
adjusting the flow rate of the gas into the slurry based on the sulfite concentration/sulfite concentration measurement to adjust oxidation of the sulfite contained in the slurry to less than 100%, effective to reduce total nitrite and nitrate levels in the slurry.

12. The method of claim 11, wherein adjusting the flow rate of the gas is further based on a predetermined sulfite concentration of the slurry.

13. The method of claim 11, wherein the sensor comprises a sulfite analyzer used for measuring sulfite concentration.

14. The method of claim 11, wherein oxidation is less than 100%, and total nitrite and nitrate levels in the slurry are reduced by 50% or greater as compared to total nitrite and nitrate levels in the slurry at 100% oxidation.

15. The method of claim 11, wherein the slurry comprises about 5 ppm to about 80 ppm of sulfite.

16. The method of claim 11, further comprising adjusting alkaline slurry supply based on the sulfite concentration/sulfite concentration measurement to adjust oxidation of the sulfite contained in the slurry to less than 100%, effective to reduce total nitrite and nitrate levels in the slurry.

17. The method of claim 11, wherein the gas is an oxygen-containing gas.

18. The method of claim 11, wherein the sensor comprises a virtual analyzer.

* * * * *